Dec. 2, 1969   L. MÖGELE   3,481,698
METHOD OF PRODUCING HIGHLY PURE ARSENIC TRICHLORIDE
Filed June 17, 1968
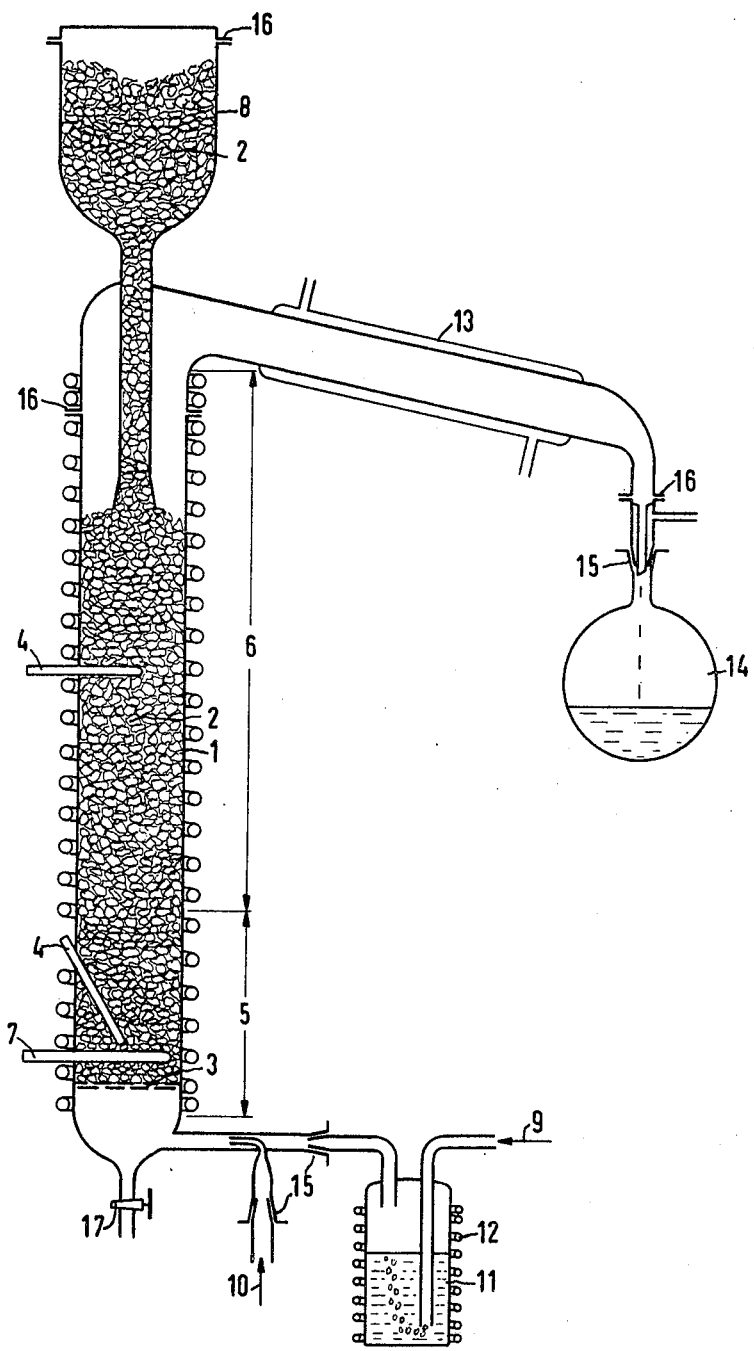

United States Patent Office 3,481,698
Patented Dec. 2, 1969

3,481,698
METHOD OF PRODUCING HIGHLY PURE ARSENIC TRICHLORIDE
Ludwig Mögele, Erlangen, Germany, assignor to Siemens Aktiengesellschaft, Berlin, Germany, a corporation of Germany
Filed June 17, 1968, Ser. No. 737,609
Claims priority, application Germany, June 15, 1967, S 110,331
Int. Cl. C01b 27/00, 9/02
U.S. Cl. 23—98    4 Claims

ABSTRACT OF THE DISCLOSURE

Described is a method of producing highly pure arsenic trichloride from its elements. The process is characterized in that the chlorination of the arsenic is carried out with steam contianing chloride at a temperature above the boiling point of arsenic trichloride, and preferably in the range between 140 to 250° C. The resultant gaseous halogen is passed, prior to condensation, through a reaction column, filled with arsenic.

---

German Patent 1,181,919 (U.S. Patent 3,359,071) describes the production of highly pure arsenic trichloride whereby the arsenic trichloride initially produced from the elements, is reacted with water in an amount just about sufficient to dissociate hydrolytically the impurities of the arsenic halide, but not sufficient to precipitate arsenic trioxide. The halide is thereafter separated from the dissociation products by distillation. The, thus purified, arsenic trichloride may then be reduced to arsenic, in a known manner, by using hydrogen.

I have discovered that the above method may be considerably improved in a very simple manner, by carrying out the arsenic chlorination with (steam) water vapor containing chloride at a temperature above the boiling point of arsenic trichloride, and preferably within the range of 140 to 250° C. and by passing the resultant gaseous arsenic, trichloride prior to condensation, through a reaction column filled with arsenic.

The advantage of my method is primarily that it now becomes possible to effect the production of highly pure $AsCl_3$ in a single step. The impurities, which form during the chlorination process and enter into the reaction product as chlorides, are already hydrolytically dissociated by the water carried along in the chlorine current in nascent state. The oxides formed thereby either remain in the residue, for example $SiO_2$ or escape as a gas, for example $SO_2$.

When moist chlorine is used, a small amount of $AsCl_3$ is also hydrolytically dissociated and is precipitated in finely distributed form as $As_2O_3$. Since the surface of the formed oxide is very active, it is capable to adsorb foreign elements, particularly heavy metals and their compounds, and thus also contributes to the purification of the arsenic trichloride.

Another advantage of the new method lies in the fact that it can be carried out continuously and without maintenance.

The $AsCl_3$, is completely free of chlorine and may be immediately reduced, with hydrogen, to spectrally pure arsenic, without additional means.

The present invention will be disclosed in greater detail with respect to the single figure wherein:

The chlorination reactor 1 is comprised of quartz and is filled with comminuted raw arsenic above quartz frit 3, which is preferably molten into the wall of the chlorination reactor. The optimum grain size of the raw arsenic is from 3 to 5 mm. The temperature in the reactor is controlled with the aid of the thermal sensors 4. At 7 is an air cooler, for example a quartz-glass spiral. The necessary raw arsenic is continuously delivered from storage vessel 8. At 5 and 6 are heating systems, which are controlled via temperature sensors 4. The chlorine is introduced at 9 and the nitrogen is introduced at 10.

The filled-in reaction product is first of all heated in a nitrogen atmosphere up to 200° C. and subsequently brought into contact with a mixture of water vapor containing chloride and nitrogen. The admixture of the water vapor takes place in distilled water filled wash bottles 11, preferably heated by means of heating system 12, to approximately 60° C. and flooded by the chlorine gas, to be reacted. Naturally, the water vapor may also be introduced into the chlorination reactor along with the nitrogen current or via a separate inlet.

The quantitative reaction of chlorine with raw arsenic now takes place in the lower region of the reactor which is enclosed by the heating systems. At the set reaction temperature (200° C.), the resulting $AsCl_3$ immediately forms as a gas. Due to the resultant momentary dissolution of the $AsCl_3$ from the substrate surface, first of all the flowing in chlorine gas is provided with new areas for attacking, and secondly, an undesirable, no longer controllable expansion or migration, of the reaction zone is prevented.

Thereafter, the formed, gaseous $AsCl_3$ passes the entire raw arsenic filler of the reactor, which is filled as much as possible and not only effects an absolute elimination of any traces of chlorine gas dissolved in the $AsCl_3$ but also causes an additional purification effect in the product.

While the heavy metal impurities, present in the raw arsenic, accumulate in the reactor residue as non-volatile chlorides or oxides, the sulfur oxides formed with the $AsCl_3$ are volatile and are eliminated, due to reaction with the arsenic or with the arsenic (III) oxide formed, according to the following equations:

$$4As_2O_3 + 3S_2Cl_2 + 9Cl_2 \rightarrow 8AsCl_3 + 6SO_2$$

$$2As_2O_3 + 6S_2Cl_2 \rightarrow 4AsCl_3 + 3SO_2 + 9S$$

$$8As + 12S_2Cl_2 \rightarrow 24S + 8AsCl_3$$

The $SO_2$ formed by the reaction escapes as a gas from the reaction products, while the elemental sulfur is adsorbed at the surface of the column of loose material and enters, during the ensuring reaction process into the reactor residue.

The temperature in the upper region of the column reactor is adjusted also above the boiling temperature of the arsenic trichloride, that is to approximately 180 to 200° C.

After passing the reactor column, the gaseous $AsCl_3$ is condensed by the condenser 13 and collected in the vessel 14. In the figure the polished joints are shown at 15 and the flanged joints at 16. The residue outlet is seen at 17.

In a reactor as seen in the figure, the raw arsenic filling was 7 kg. to give a height for the loose material of 0.8 m. in the 0.08 m. diameter vessel. The temperature of the reactor was 200° C. in the lower portion 5 and 180° C. in the upper portion 6.

The height of the lower portion or zone 5 was 292 mm. and the upper portion or zone 6 was 745 mm. The height of arsenic in zone 5 was 247 mm. and in zone 6 was 555 mm. A flow of 210 liters of chlorine gas and 30 liters of nitrogen were supplied to the reactor, per hour. The chlorine gas had previously passed through hot water of 60°, so that it may absorb water vapor. The yield for an 8 hour day was 5.2 kg. of highly pure $AsCl_3$, which may be by hydrogen reduced in known manner to pure arsenic, for use in semiconductors.

By employing the method of the present invention, highly pure chlorine-free arsenic trichloride may be economically obtained within a short time.

It is preferable, thereby, not to effect chlorination to a complete exhaustion of the reactor filling, but rather to add more raw arsenic after consuming about half of the reaction product, or to continuously supply raw arsenic in accordance with its consumption to storage vessel 8. While nitrogen has been shown as the carrier gas other inert gas such as argon or helium may also be used.

The arsenic trichloride is particularly suitable for obtaining absolutely spectrally pure arsenic, such as is used for semiconductor purposes.

I claim:

1. The method of producing highly pure arsenic trichloride from its elements, which comprise chlorinating arsenic containing impurties some of which form sulfur oxides with water vapor containing chlorine at a temperature above the boiling point of arsenic trichloride, and the passing formed gaseous arsenic trichloride and sulfur oxides, prior to condensation, through a reaction column, filled with arsenic.

2. The method of claim 1, wherein the reaction temperature is between 140 and 250° C.

3. The method of claim 1, wherein a highly pure inert gas is added, as a carrier gas, to the water containing chlorine.

4. The method of claim 3 wherein the inert gas is nitrogen, helium or argon.

References Cited

UNITED STATES PATENTS 3,359,071    12/1967    Merkel _____ 23—98 XR

OTHER REFERENCES

J. W. Mellor's "A Comprehensive Treatise on Inorganic and Theoretical Chemistry," vol. IX, 1929, ed., pp. 237, 240 and 241, Longmans, Green & Co., New York.

Jacobson's "Encyclopedia of Chemical Reactions," vol. 1, p. 270. (Copy received in U.S. Pat. Office Scientific Lib., May 14, 1948), Reinhold Pub. Corp., New York.

EDWARD STERN, Primary Examiner

U.S. Cl. X.R.

23—177, 209, 226